United States Patent
Boyer et al.

(10) Patent No.: US 7,711,649 B2
(45) Date of Patent: *May 4, 2010

(54) METHODOLOGIES AND ANALYTICS TOOLS FOR IDENTIFYING POTENTIAL LICENSEE MARKETS

(75) Inventors: Stephen Kane Boyer, San Jose, CA (US); Ying Chen, San Jose, CA (US); Jeffrey Thomas Kreulen, San Jose, CA (US); James J. Rhodes, Los Gatos, CA (US); William Scott Spangler, San Martin, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/418,862

(22) Filed: Apr. 6, 2009

(65) Prior Publication Data
US 2009/0198570 A1    Aug. 6, 2009

Related U.S. Application Data

(63) Continuation of application No. 11/674,587, filed on Feb. 13, 2007, now Pat. No. 7,536,357.

(51) Int. Cl.
*G06F 17/60*    (2006.01)
(52) U.S. Cl. .............................. 705/59; 705/50; 705/51
(58) Field of Classification Search .................. 705/59, 705/50, 51
See application file for complete search history.

(56) References Cited

U.S. PATENT DOCUMENTS

| | | | |
|---|---|---|---|
| 6,424,971 B1 | 7/2002 | Kreulen et al. | |
| 2002/0095368 A1 | 7/2002 | Tran | |
| 2004/0122841 A1 | 6/2004 | Goodman et al. | |
| 2005/0210008 A1 | 9/2005 | Tran et al. | |
| 2005/0210009 A1 | 9/2005 | Tran | |
| 2007/0073748 A1* | 3/2007 | Barney | 707/101 |
| 2008/0127304 A1* | 5/2008 | Ginter et al. | 726/2 |
| 2009/0132805 A1* | 5/2009 | Ginter et al. | 713/150 |

FOREIGN PATENT DOCUMENTS

| | | | |
|---|---|---|---|
| JP | 2002373216 A | | 12/2002 |
| JP | 2006039835 A | * | 2/2006 |

OTHER PUBLICATIONS

Rasmussen, E. "Clustering algorithms," Information Retrieval: Data Structures and Algorithms; ed. Frakes, W. B. and Baeza-Yates, R., 1992; pp. 419-442; Prentice Hall, Englewood Cliffs, New Jersey.

* cited by examiner

*Primary Examiner*—Pierre E Elisca
(74) *Attorney, Agent, or Firm*—Shimokaji & Associates, P.C.

(57) ABSTRACT

A method is disclosed for use with at least one initial document describing a technical concept suitable for licensing, the method comprising: retrieving a set of intellectual property documents from a data warehouse; partitioning the set of intellectual property documents into a plurality of document categories; classifying the set of intellectual property documents by an industry parameter; constructing a contingency table that includes a listing of industry classifications for each of the document categories, and identifying documents within a particular one of the document categories that have different industry classifications so as to identify at least one potential new licensee industry of the technical concept described in the initial document.

21 Claims, 2 Drawing Sheets

METHODOLOGIES AND ANALYTICS TOOLS FOR IDENTIFYING POTENTIAL LICENSEE MARKETS

CROSS-REFERENCE TO RELATED APPLICATION

This application is a continuation application of patent application Ser. No. 11/674,587 filed Feb. 13, 2007.

BACKGROUND OF THE INVENTION

The present invention relates generally to the field of online analytic processing of data and, in particular, to patent and web-related analytics tools and methodologies for assisting in the identification of potential licensee markets.

Modern business intelligence routinely makes extensive use of customer and technical data obtained from databases stored in data warehouses. Such business intelligence may typically be obtained by posing an analytical search and/or query to one or more associated relational databases. Intellectual property (IP) intelligence, in particular, may be critical to the competitive advantage of a business entity. The business entity may seek to maximize the value of its IP assets by investigating and identifying high-potential licensees for some or all of its IP assets, especially for its patents.

In the current state of the art, however, the process of identifying high-potential licensees can be time-consuming and ineffective. For example, taking the approach of selecting a group of "seed" patents and conducting a search via the Internet may require multiple labor-intensive and time-consuming sessions. Moreover, the search results may require further manual processing to yield understandable results, results that may or may not be of value to the interested business entity.

As can be seen, there is a need for better methodologies and tools dedicated to the identification of worthwhile licensee markets.

SUMMARY OF THE INVENTION

One embodiment of the present invention is a method for use with at least one initial document describing a technical concept suitable for licensing, the method comprising: retrieving a set of intellectual property documents from a data warehouse, each intellectual property document having a statistical similarity to the initial document, partitioning the set of intellectual property documents into a plurality of document categories, classifying the set of intellectual property documents by an industry parameter, constructing a contingency table that includes a listing of industry classifications for each of the document categories, and identifying documents within a particular one of the document categories that have different industry classifications so as to identify at least one potential new licensee industry of the technical concept described in the initial document.

Another embodiment of the present invention is a method for use with a group of patents retrieved from a data warehouse, the group of retrieved patents related to a given seed patent, the method comprising: extracting a set of similar patents from the group of retrieved patents, each of the similar patents associated with the given seed patent using a statistical method, generating a refined taxonomy for the given seed patent and the set of similar patents using at least one of words analysis, bag of words analysis, phrases analysis, structured features, and unstructured features, deriving an industry taxonomy from the set of similar patents using at least one of words analysis, bag of words analysis, phrases analysis, structured features, and unstructured features, creating a classification of industries using the industry taxonomy, and comparing the refined taxonomy and the classification of industries using contingency analysis to associate the given seed patent with at least one industry from the classification of industries.

Yet another embodiment of the present invention is a method for use with a group of patents retrieved from a data warehouse, the group of retrieved patents related to a given seed patent from an originating industry, the method comprising: extracting a set of similar patents from the group of retrieved patents, each of the similar patents associated with the given seed patent using a statistical method, classifying the given seed patent and the set of similar patents by at least one of assignees and industries, generating an industry taxonomy for the given seed patent and the set of similar patents using at least one of a structured feature and an unstructured feature, mapping assignees of the similar patents to related industries using the industry taxonomy, computing the overall similarity between the originating industry and the related industries, and computing patent similarity between the seed patent and patents assigned to the related industries.

Yet another embodiment of the present invention is a computer program storage device readable by machine which tangibly embodies a program of instructions, the instructions executable by the machine to perform a method for use with at least one initial document describing a technical concept suitable for licensing potential and a set of intellectual property documents having a statistical similarity to the initial document, the method comprising: partitioning the set of intellectual property documents into a plurality of document categories; classifying the set of intellectual property documents by one of an industry classification and an assignee classification, constructing a contingency table that includes a listing of the industry classification and the assignee classification for one or more document categories, using the contingency table to find significantly-related industries via the industry classification, and using the contingency table to find significantly-related assignees via the assignee classification.

Yet another embodiment of the present invention is a computer program product comprising a computer usable medium including a computer readable program, wherein when executed on a computer the computer readable program causes the computer to: extract a set of similar patents from the group of retrieved patents, each of the similar patents associated with the given seed patent using a statistical method, classify the given seed patent and the set of similar patents by at least one of assignees and industries, generate an industry taxonomy for the given seed patent and the set of similar patents using at least one of a structured feature and an unstructured feature, map assignees of the similar patents to related industries using the industry taxonomy, compute the overall similarity between the originating industry and the related industries, and compute patent similarity between the seed patent and patents assigned to the related industries.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

In general, elements of the present invention provide a method for analyzing predefined subject matter in a patent database in which the method functions to incorporate the inputs of one or more domain experts as the process executes. The process may include the use of keywords and searching through structured fields and unstructured fields to automatically create a feature space with numeric vectors, with the feature space being used to create taxonomies based on domain knowledge.

The present state of the art does not provide for the incorporation of domain knowledge into the process of developing a taxonomy, and does not provide for invoking expert input before conducting an analysis. In contrast, the disclosed methods function to enable domain experts to both generate and refine taxonomies, to capture domain knowledge before conducting an analysis, to compare companies to categories created via clustering and/or via one or more keyword; and to use a contingency analysis to identify potential licensing opportunities by matching companies with complementary portfolios.

Figure 1:
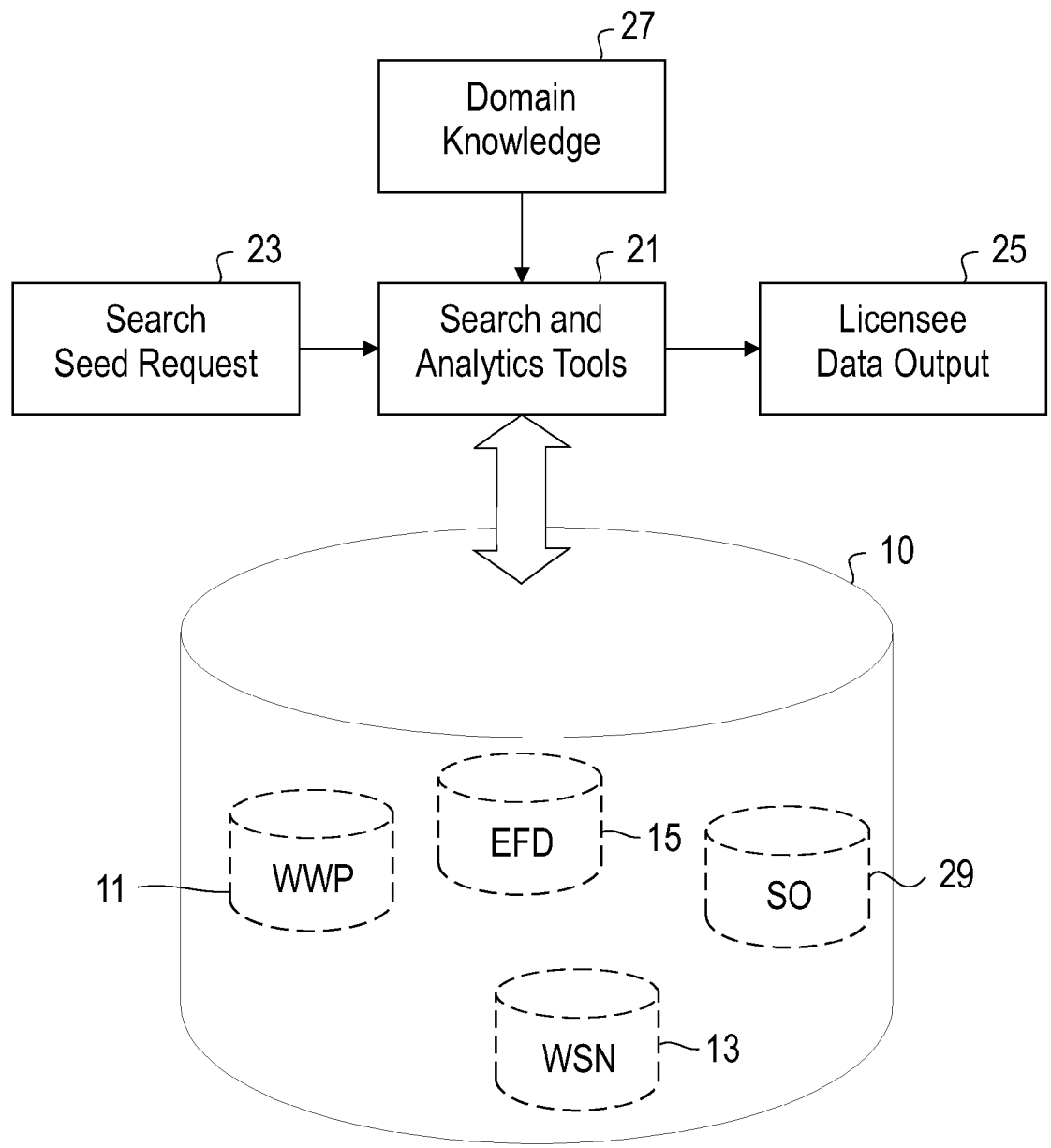
FIG. 1 is a diagrammatical illustration of a system for identifying potential patent licensees including a data warehouse, analytics tools, and domain knowledge input, in accordance with the present invention.

There is shown in FIG. 1 a data warehouse 10 which may comprise, in particular, databases useful in intellectual property analysis such as: a worldwide patent (WWP) database 11; a web, scientific, and news (WSN) database 13; and a financial (EFD) database 15 (e.g., Edgar financial data). The data warehouse 10 may also contain information about the documents comprising the worldwide patent database 11; the web, scientific, and news database 13; and the financial (FD) database 15. A search and analytics tools 21 module may access the data warehouse 10 to perform a number of functions, including: extracting patents and related documents, automatically classifying patents, performing contingency analysis, and analyzing various relationships among patents and companies, as described in greater detail below.

One or more seed patents or a seed patent category may be provided as a search seed request 23 to the search and analytics tools 21 by a database user who is interested in, for example, identifying potential patent licensees in a particular industry, here broadly denoted as a licensee data output 25. As explained in greater detail below, domain knowledge 27 provided by domain experts may be applied to execute or to enhance one or more of the functions performed by the search and analytics tools 21. For example, a process of analyzing relationships among patents and potential licensees may invoke both the expertise of an individual skilled in the technology of document classification and the expertise of a domain expert skilled in licenses and negotiation. Knowledge acquired as a result of the functions performed by the search and analytics tools 21 and by the domain experts may be written out to a string representation in the data warehouse 10 as a serialized object (SO) 29. Information in the serialized object 29 may be permanently saved and made available for sharing by other users.

In an exemplary embodiment, the search and analytics tools 21 may first initiate an "investigate" phase in which the search and analytics tools 21 (i) use a search tool to extract one or more "seed" patents (denoted as a seed patent set $P_O$) from seed patents or a seed patent category placed into the seed request 23; (ii) use a technology to produce a numeric vector space by mathematically converting the seed patents with numeric vectors corresponding to words, features, and structured information content in the seed patents; and (iii) use a nearest-neighbor technology to retrieve and identify additional, related patents (denoted as a related patent set $P_1$) not retrieved in the initial seed patent search.

Subsequently, in a "comprehend" phase, the search and analytics tools 21 may use a document classification technology or taxonomy generation technology to classify the related patents into appropriate categories using a numeric vector space and a feature space created for a combined set $(P_0+P_1)$ of the seed patents and the related patents. The document classification technology may use an interactive clustering of the feature space so as to assist a domain expert to refine the feature space if desired. This may be followed by an "examine" phase that uses a contingency method to compare two taxonomies, or to compare a taxonomy against features or structured information. For example, the taxonomy maybe compared against a set of assignees to identify whether an assignee is active or inactive, or patent categories may be compared with a set of industries related to the assignees. The examine phase may also use a trending tool to overlay patent time information over patent categories or a patent set to provide insight into patenting activities by assignees or by assignee industries as a function of time. Also, the examine phase may use an industry taxonomy for the additional step of mapping assignees to industries.

Figure 2:
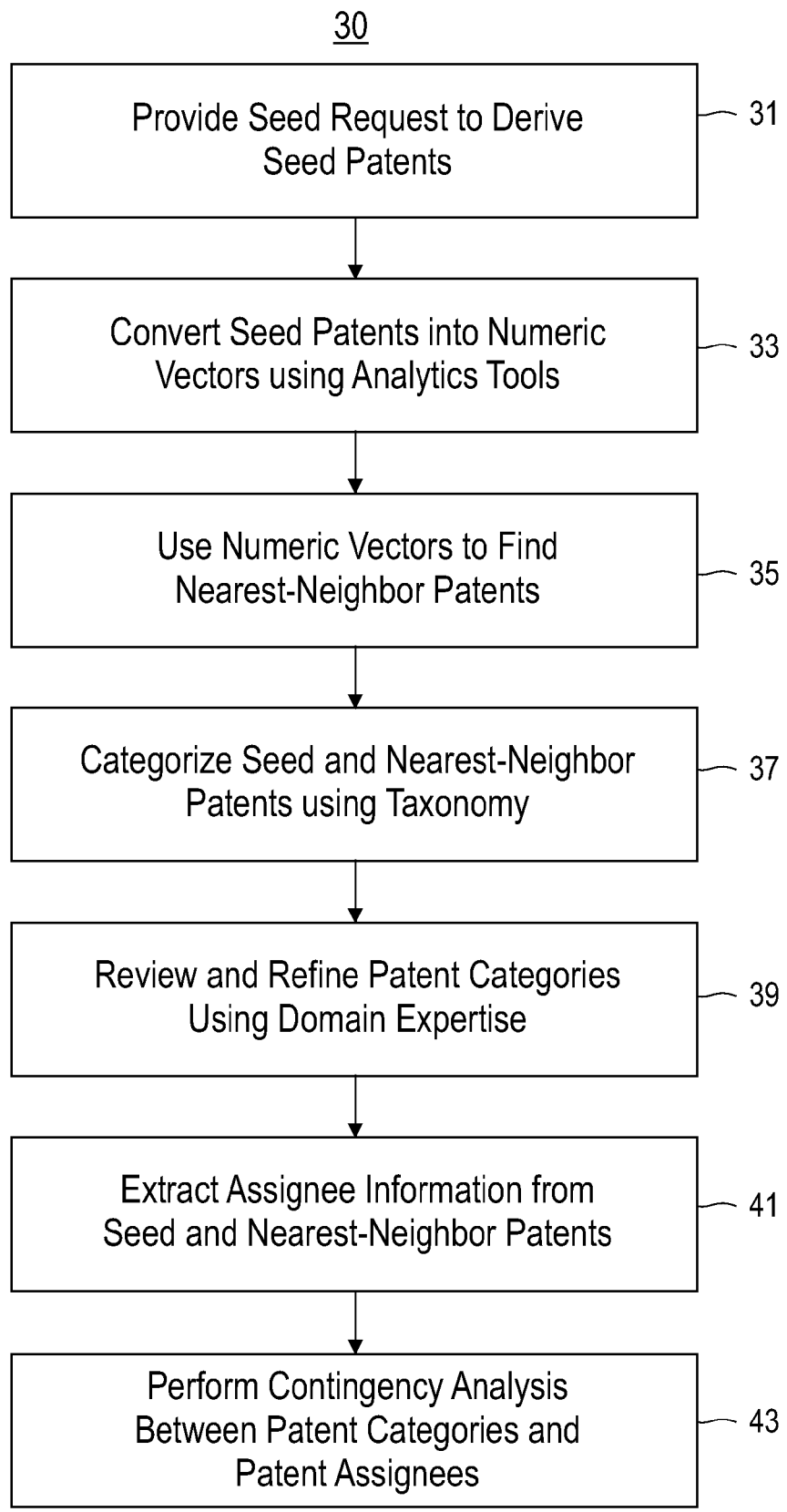
FIG. 2 is a flow diagram illustrating a method of operation for the system of FIG. 1.

A general description of the method of the present invention can be provided with additional reference to a flow diagram 30, in FIG. 2. The seed request 23 may be provided to derive one or more seed patents (i.e., the seed patent set $P_O$) from information extracted from the data warehouse 10, at step 31. As understood in the relevant art, a "search" may include entering selected words or text provided in the information from the data warehouse 10 and retrieving documents matching the words or text by using an indexing feature.

An initial assemblage of related patents (i.e., the related patent set $P_1$) may be obtained by first converting each seed patent into a set of numeric vectors corresponding to words, features, and structured content of the seed patent, at step 33. The numeric vectors are the occurrences, within each patent, of different features or structured information content. For example, if the term "Bragg" appears in a particular patent seven times, for example, then the numeric vector for the feature "Bragg" may be assigned a value of seven for the patent. This process allows for the systematic and numerical description in a feature space of each seed patent. The search and analytics tools 21 may execute a search to retrieve the related patents using the features or structured information content of the seed patents. In an exemplary embodiment, statistical methods in the search and analytics tools 21 may be used to ensure that the patents comprising the related patent set $P_1$ are similar to or nearest neighbors of the patents in the set of seed patents $P_0$, at step 35.

A taxonomy $T_1$ may be automatically generated for the combined patent set $(P_0+P_1)$ by placing words, bag of words, phrases analysis, structured features, and unstructured features into a respective category or cluster in the taxonomy $T_1$, at step 37. Each of the categories in the taxonomy $T_1$ may be represented by a corresponding mathematical model. For each category in the taxonomy $T_1$, domain expertise may be used to find the patents and files that best match the model for that category and determine if they are indeed related.

This process effectively partitions the combined patent set $(P_0+P_1)$ such that each patent is assigned to a taxonomy category and appears in only one taxonomy category. An uncategorized term may be placed into an existing category if an appropriate category exists, or into a new category if the appropriate category does not exist. This process allows for the systematic and numerical description in a feature space of each patent in the patent set. The combined patent set $(P_0+P_1)$ may then be partitioned using the taxonomy $T_1$.

In an exemplary embodiment, the process of partitioning the patent set may use a "k-means" procedure, where the parameter "k" refers to the number of categories produced from the patent set. The parameter "k" maybe input to the analytics tools 21 by the domain expert, or it may be generated based on the size of the combined patent set $(P_0+P_1)$. The distance between a centroid of a category and a document numeric vector in the category may be expressed as a cosine distance metric $$d(X, Y) = -\frac{X \cdot Y}{\|X\| \cdot \|Y\|}$$

where X is the centroid vector and Y is the patent numeric vector. The centroid is equivalent to the mean of the related category and may be found as part of the k-means partitioning process. A more detailed explanation of the generation of feature spaces and taxonomy generation may be obtained from commonly-assigned U.S. Pat. No. 6,424,971, "System and method for interactive classification and analysis of data."

A domain expert may again enter the process at this point and review the resulting taxonomy $T_1$ to filter out noise and produce a refined taxonomy $T_1'$, at step 39. The taxonomy $T_1$ can be refined, for example, by deleting a taxonomy category determined to be trivial; by merging two or more similar taxonomy categories into a single category, and/or by creating a new taxonomy category. Each of the patents in the combined patent set $(P_0+P_1)$ may thus be reclassified using the edited categories comprising the refined taxonomy $T_1'$.

Assignee information may be extracted from the combined patent set $(P_0+P_1)$, at step 41. In an exemplary embodiment, contingency analysis may be used to generate a contingency table that compares the patent categories in the refined patent taxonomy $T_1'$ and the patent assignees, at step 43. By extracting the assignee information for every patent in the combined patent set $(P_0+P_1)$, the potential licensee markets may be extrapolated. That is, a company that has no assigned patents in a technical field "X" may not have an interest in licensing a patent in the technical field "X."

In another exemplary embodiment, an industry taxonomy may be created and used to map assignees in the combined patent set $(P_0+P_1)$ to their respective industries. Contingency analysis may be applied to qualitatively comprehend how closely related different target industries are with respect to the seed patents' originating industry. A target industry may appear to have little potential as a potential licensee because it is not closely related to the seed patents' industry, but may in reality be a high-potential licensee target because it has patents closely related to the seed patents.

In yet another exemplary embodiment, trending information may be overlaid both on the refined patent taxonomy $T_1'$ and on the contingency table to enable the domain expert to identify recent and most related industries. It can be appreciated that other significant relationships, if any, among industries, assignees, and the seed patents $P_0$ may be similarly found using a contingency table.

It can be appreciated by one skilled in the relevant art that the disclosed method can be applied to find a licensee market for a given company or for a given industry. A patent portfolio analysis is preferably conducted to classify the patents for the given company, or for the given industry, into appropriate categories. With the patents categorized, the disclosed method and analytical tools may be used to identify licensee markets for one or more selected category of patents.

This process may be illustrated by the following example in which a potential lateral licensee market is sought, given two laser-related seed patents (i.e., the seed patents set $P_0$) from a fictitious company AcmeLaser. The analytics tools 21 may automatically convert the seed patents into numeric vectors through words, phrase, and "bag of words" analysis. Such numeric vectors, together with structured information such as patent inventors, may be used to find patents most closely related to the seed patents.

The retrieved patents may be compared via a cosine similarity metric. Some or all of the retrieved patents that are "nearest neighbors" to the original seed patents may be retained to form the combined patent set $(P_0+P_1)$, as shown in Table 1. In the example provided, a total of two hundred twenty six patents are retained, in addition to the two seed patents, grouped into eighteen categories, where the first category includes the seed patents. Table 1 also includes a "cohesion" column and a "distinctness" column that provide statistical information useful for category refinements.

TABLE 1

Nearest-Neighbor Patent Set

| Entry | Category Name | Size | Cohesion | Distinctness |
|---|---|---|---|---|
| 1 | Acme Laser Patents | 2 | 97.19% | 23.93% |
| 2 | Radiation Application | 3 | 91.00% | 60.41% |
| 3 | Laser Cosmetic Surgery | 6 | 89.71% | 44.79% |
| 4 | Tissue Treatment with Pulsed Light Source | 6 | 86.50% | 47.78% |
| 5 | Laser Device for Skin Perforation | 7 | 84.87% | 21.80% |
| 6 | Skin Treatment | 4 | 83.33% | 31.89% |
| 7 | Dental Procedures using Ultraviolet Radiation | 6 | 79.44% | 59.39% |
| 8 | Hair Removal Devices | 3 | 78.18% | 66.13% |
| 9 | Laser Treatment of Skin Abnormalities | 5 | 77.14% | 41.17% |
| 10 | Light Energy Delivery Head | 6 | 77.02% | 60.41% |
| 11 | Related Patents | 12 | 75.12% | 23.93% |
| 12 | Deep Tissues Laser | 16 | 67.17% | 21.80% |
| 13 | Laser Treatment of Skin Surface | 6 | 66.28% | 31.34% |
| 14 | Wrinkle Smoothing | 13 | 57.02% | 36.03% |
| 15 | Lasers for Hair Removal | 67 | 54.33% | 31.89% |

TABLE 1-continued

Nearest-Neighbor Patent Set

| Entry | Category Name | Size | Cohesion | Distinctness |
|---|---|---|---|---|
| 16 | Wound Treatment | 8 | 52.32% | 44.96% |
| 17 | Vascular Lesions | 17 | 50.54% | 25.65% |
| 18 | Laser Medical Treatments | 41 | 46.56% | 25.65% |
| | Total/Average | 228 | 61.19% | 32.73% |

As used herein, the term "cohesion" may be defined as an indication of the similarity of documents to one another for documents in a given taxonomy category. A cohesion value of 100%, for example, indicates that the documents in a taxonomy category all have the same word content. The term "distinctness" may be defined as the degree to which two taxonomy categories are different from one another. Each taxonomy category in Table 2 is represented by a category centroid, the centroid being the average of all feature vectors of the documents in the category. Distinctness between two taxonomy categories provides an indication of their difference. A distinctiveness value for two taxonomy categories may be obtained by determining the distance between category centroids, where the distance is taken between closest centroid neighbors in the feature space. A distinctiveness value of zero would indicate that the category centroids are coincident and that the respective taxonomy categories are thus not distinct from one another.

Table 2 illustrates a contingency table (partially shown for clarity of illustration) with patent categories from Table 1 heading table columns, and patent assignees heading table rows. Table 2 may be used by a domain expert, for example, to visualize how various companies may be related to the various patent categories. Table cells include the number of patents assigned to a company heading the respective row. Each cell may have an "expected" value different from the number of patents listed in the cell. The expected value may be specified by multiplying the number of patents appearing in the patent category by a fraction, where the fraction is determined by dividing the total patents assigned to a company by the total number of patents in the combined patent set $(P_0+P_1)$.

TABLE 2

| Patent Assignee | Lasers for Hair Removal | Light Energy Delivery Head | Radiation Application |
|---|---|---|---|
| Thermolase Corporation | 8 | 0 | 0 |
| Cynosure, Inc. | 7 | 0 | 0 |
| Altus Medical | 5 | 0 | 0 |
| ESC Medical Systems Ltd. | 5 | 0 | 0 |
| General Hospital Corp. | 2 | 0 | 0 |
| Altralight, Inc. | 1 | 0 | 0 |
| Applied Optronics Corp. | 1 | 0 | 0 |
| Cooltouch Corp. | 1 | 0 | 0 |
| Ceram Optec | 1 | 0 | 2 |
| DRDC Limited | 1 | 0 | 0 |
| ICN Photinics Ltd. | 1 | 0 | 0 |
| Keralase Ltd. | 1 | 0 | 0 |
| Lumenis Ltd. | 1 | 0 | 0 |
| Luxar Corp. | 1 | 0 | 0 |
| Lucid Technologies | 1 | 0 | 0 |
| Nidek Co. | 1 | 0 | 0 |
| Sahar Technologies | 1 | 1 | 0 |
| Y?Beam Technologies | 1 | 0 | 0 |

If the expected value is exceeded by the actual value in the cell, then the cell may be rendered in color, shaded, or highlighted so as to be more readily noticed by the domain expert. The degree of shading or the choice of color may be related to the degree of significance of the cell's value, which may be calculated using a statistical test, such as the chi-squared test. Shading may indicate a significant relationship between the respective company and the respective category.

It can be appreciated by one skilled in the art that the invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

What is claimed is:

1. A method for use with at least one initial document describing a technical concept suitable for licensing, the method comprising:
   retrieving a set of intellectual property documents from a data warehouse, each intellectual property document having a statistical similarity to said initial document;
   partitioning said set of intellectual property documents into a plurality of document categories;
   classifying said set of intellectual property documents by an industry parameter;
   constructing a contingency table that includes a listing of industry classifications for each of said document categories, by using computer processing on a computer, and
   identifying documents within a particular one of said document categories that have different industry classifications so as to identify at least one potential licensee of said technical concept described in said initial document.

2. The method of claim 1, wherein said at least one initial document is selected from the group consisting of: patents, trademarks, copyrights, and trade secrets.

3. The method of claim 1 wherein retrieved intellectual property documents are identified by at least one of a search operation and a query operation.

4. The method of claim 1 wherein said classifying step comprises classifying intellectual property documents by assignee.

5. The method of claim 1 wherein said partitioning step comprises generating a taxonomy.

6. The method of claim 1 wherein said constructing step comprises overlaying a trending template to identify recent industry classifications.

7. A method for use with a group of patents retrieved from a data warehouse, the group of retrieved patents related to a given seed patent, the method comprising:
   extracting a set of similar patents from said group of retrieved patents, each of said similar patents associated with said given seed patent using a statistical method;
   generating a refined taxonomy for said given seed patent and said set of similar patents using at least one of words analysis, bag of words analysis, phrases analysis, structured features, and unstructured features;
   deriving an industry taxonomy from said set of similar patents using at least one of words analysis, bag of words analysis, phrases analysis, structured features, and unstructured features;
   creating a classification of industries using said industry taxonomy, by using computer processing on a computer; and
   comparing said refined taxonomy and said classification of industries using contingency analysis to associate said given seed patent with at least one industry from said classification of industries.

8. The method of claim 7 wherein said creating step comprises mapping assignees of said given seed patent and said set of similar patents to respective industries using said industry taxonomy.

9. The method of claim 7 further comprising using domain knowledge to refine the selection of patents in said set of similar patents.

10. The method of claim 9 wherein said step of using domain knowledge comprises:
    deriving a second seed patent from said group of similar patents;
    retrieving a second group of patents from said data warehouse related to said second seed patent;
    extracting a second set of similar patents from said second group of retrieved patents, each of said similar patents in said second set of similar patents associated with said second seed patent using said statistical method; and
    generating a second refined taxonomy for said seed patent and said second set of similar patents using at least one of words analysis, bag of words analysis, phrases analysis, structured features, and unstructured features.

11. The method of claim 7 wherein said creating step comprises classifying said given seed patent and said set of similar patents by assignee.

12. A method for use with a group of patents retrieved from a data warehouse, the group of retrieved patents related to a given seed patent from an originating industry, the method comprising:
    extracting a set of similar patents from said group of retrieved patents, each of said similar patents associated with said given seed patent using a statistical method;
    classifying said given seed patent and said set of similar patents by at least one of assignees and industries;
    generating an industry taxonomy for said given seed patent and said set of similar patents using at least one of a structured feature and an unstructured feature;
    mapping assignees of said similar patents to related industries using said industry taxonomy;
    computing the overall similarity between said originating industry and said related industries; and
    computing patent similarity between said seed patent and patents assigned to said related industries.

13. The method of claim 12 wherein said step of computing patent similarity comprises:
    deriving a feature space using said industry taxonomy; and
    computing distances in said feature space between said seed patent and said patents assigned to said related industries.

14. The method of claim 12 further comprising identifying industries having licensing potential by comparing said overall similarity and said patent similarity using said industry classification.

15. The method of claim 12 further comprising identifying potential licensee targets by comparing said overall similarity and said patent similarity using said assignee classification.

16. The method of claim 12 further comprising overlaying trend information on said industry taxonomy to identify recent industries.

17. The method of claim 12 wherein said feature space comprises one or more of a structured feature, an unstructured feature, and an annotation.

18. A computer program storage device readable by machine, tangibly embodying a program of instructions executable by the machine to perform a method for use with at least one initial document describing a technical concept suitable for licensing potential and a set of intellectual property documents having a statistical similarity to said initial document, the method comprising:
    partitioning said set of intellectual property documents into a plurality of document categories;
    classifying said set of intellectual property documents by at least one of an industry classification and an assignee classification;
    constructing a contingency table that includes a listing of said industry classification and said assignee classification for one or more document categories;

using said contingency table to find significantly-related industries via said industry classification; and using said contingency table to find significantly-related assignees via said assignee classification.

19. The computer program storage device of claim 18 further comprising, for each industry class in said industry classification, computing a distance between an industry originating with said initial document and said industry class wherein numeric vectors are used to determine closeness of respective industries to said industry originating with said initial document.

20. The computer program storage device of claim 18 further comprising computing a distance between a subject matter described in said initial document and subject matter described in said set of intellectual property documents, wherein numeric vectors are used to determine closeness of a technical concept disclosed in an industry intellectual property document to a technical concept disclosed in said initial document.

21. A computer program product for use with a group of patents retrieved from a data warehouse, the group of retrieved patents related to a given seed patent from an originating industry, the computer program product comprising a computer usable medium including a computer readable program, wherein when executed on a computer the computer readable program causes the computer to:

extract a set of similar patents from said group of retrieved patents, each of said similar patents associated with said given seed patent using a statistical method;

classify said given seed patent and said set of similar patents by at least one of assignees and industries;

generate an industry taxonomy for said given seed patent and said set of similar patents using at least one of a structured feature and an unstructured feature;

map assignees of said similar patents to related industries using said industry taxonomy;

compute the overall similarity between said originating industry and said related industries; and compute patent similarity between said seed patent and patents assigned to said related industries.

\* \* \* \* \*